United States Patent [19]

Soloff

[11] Patent Number: 5,023,718
[45] Date of Patent: Jun. 11, 1991

[54] STORING DIGITAL VIDEO SIGNALS

[75] Inventor: Jonathan M. Soloff, Basingstoke, United Kingdom

[73] Assignee: Sony Corporation, Tokyo, Japan

[21] Appl. No.: 515,643

[22] Filed: Apr. 25, 1990

Related U.S. Application Data

[63] Continuation of Ser. No. 203,259, May 27, 1988, abandoned.

[30] Foreign Application Priority Data

Jul. 14, 1987 [GB] United Kingdom ............... 8716564

[51] Int. Cl.$^5$ .............................................. H04N 5/14
[52] U.S. Cl. .................................. 358/160; 365/189
[58] Field of Search ................. 358/160, 22; 364/521, 364/518; 365/189, 238, 230, 235; 340/750, 798, 790; 360/13, 14.1

[56] References Cited

U.S. PATENT DOCUMENTS

| | | | |
|---|---|---|---|
| 4,148,070 | 4/1979 | Taylor | 358/160 |
| 4,183,058 | 1/1980 | Taylor | 358/138 |
| 4,485,402 | 11/1984 | Searby | 358/160 |
| 4,612,569 | 9/1986 | Ichinase | 358/22 |

Primary Examiner—James J. Groody
Assistant Examiner—David E. Harvey
Attorney, Agent, or Firm—Lewis H. Eslinger

[57] ABSTRACT

Apparatus for storing a plurality of fields of digital video signal where each field consists of a plurality of n-bit words and n may vary downwards from a maximum value, comprises circuits for arranging the n-bit words of each incoming field in n bit-planes, each bit-plane containing a respective bit from each n-bit word, a video signal store comprising a plurality of memories each capable of storing the bits of a bit-plane, a common data bus for supplying the bit-planes to the memories, and circuits for controlling writing of the bit-planes in the memories such that a first field is written in a first n of the memories, the next field is written in a second n of the memories, and so on until all memories have been written in.

12 Claims, 5 Drawing Sheets

STORING DIGITAL VIDEO SIGNALS

This is a continuation of application Ser. No. 07/203,259, filed 5-27-88 now abandoned.

BACKGROUND OF THE INVENTION

1. Field of the Invention

This invention relates to methods of and apparatus for storing digital video signals.

2. Description of the Prior Art

Requirements exist, in for example a slow motion video signal processor, to store about one second of digital video signal in random access memory. The amount of digital data involved is very large, and this requires a correspondingly large amount of random access memory. One way of reducing the amount of random access memory required (or alternatively of increasing the duration of video signal which can be stored) is to reduce the length of the words forming the digital data by using differential pulse code modulation. With this technique, it is for example possible to reduce the length of each word in the digital data from the usual eight bits to five bits, without severe loss of quality in the subsequently reproduced picture.

However, this reduction in the word length will not necessarily always be required, and this introduces the problem of providing a video signal store which is capable of efficiently storing a digital video signal, the word length of which may vary. Thus, if the standard word length is eight bits, then the usual video signal store will of course have provision for storing the eight bits of each input word. If, however, the length of the input words is sometimes reduced to say five bits, then the usual video signal store can be arranged to store the five bits of each input word, but will leave empty the storage locations for the remaining three bits not now present. In other words, many storage locations will not be used, and there will be no increase in the duration of video signal which can be stored.

SUMMARY OF THE INVENTION

One object of the present invention is to provide an improved method of storing a plurality of fields of digital video signal.

Another object of the present invention is to provide an improved apparatus for storing a plurality of fields of digital video signal.

Another object of the present invention is to provide an improved apparatus for storing a plurality of fields of digital video signal where the word length of the digital video signal may vary.

According to the present invention there is provided a method of storing a plurality of fields of digital video signal where each field consists of a plurality of n-bit words and n may vary downwards from a maximum value, the method comprising the steps of:

arranging the n-bit words of each incoming field in n bit-planes, each said bit-plane containing a respective single bit from each said n-bit word;

providing a video signal store comprising a plurality of memories each capable of storing the bits of a said bit-plane;

supplying said bit-planes over a common data bus to said memories; and controlling writing of said bit-planes in said memories such that a first field is written in a first n of said memories, the next field is written in a second n of said memories, and so on until all said memories have been written in.

According to the present invention there is also provided apparatus for storing a plurality of fields of digital video signal where each field consists of a plurality of n-bit words and n may vary downwards from a maximum value, the apparatus comprising:

means for arranging the n-bit words of each incoming field in n bit-planes, each said bit-plane containing a respective single bit from each said n-bit word;

a video signal store comprising a plurality of memories each capable of storing the bits of a said bit-plane;

a common data bus for supplying said bit-planes to said memories; and means for controlling writing of said bit-planes in said memories such that a first field is written in a first n of said memories, the next field is written in a second n of said memories, and so on until all said memories have been written in.

The above, and other objects, features and advantages of this invention will be apparent from the following detailed description of illustrative embodiments which is to be read in connection with the accompanying drawings.

DESCRIPTION OF THE PREFERRED EMBODIMENTS

The embodiment to be described is for use in a slow motion video signal processor in which it is required to provide a video signal store capable of storing approximately one second of digital video signal. The video signal may relate to a 50-fields per second 625-line television system or to a 60-fields per second 525-line system, and in either case the original analog video signal is sampled at 13.5 MHz and the resulting samples are normally pulse code modulation coded into 8-bit words, referred to herein as standard length words. The slow motion video signal processor continuously cyclically overwrites the incoming digital video data into the video signal store, so that at any time the most recent one second or so of the video signal is available for slow motion processing if required. To increase the duration of video signal which can be stored, differential pulse code modulation coding may be used, in which case each sample may result in a 5-bit word, referred to herein as a shorter word. Clearly, however, the required increase in the duration of the video signal stored can only be realized if the video signal store can store the shorter words efficiently.

Figure 1A:
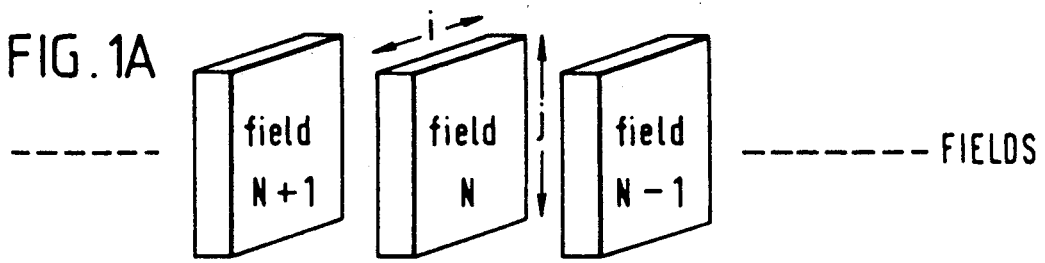
FIGS. 1A to 1C show diagrammatically the arrangement of fields of video signal into bit-planes and groups of bit-planes.

Referring to FIG. 1A, this shows diagrammatically three successive fields N−1, N and N+1 of an incoming digital video signal. Each field relates either to the luminance components or to the chrominance components of the input video signal, and in both cases the processing to be done is the same, so for simplicity only the luminance components will be considered hereinafter. To economize on storage capacity, only the active video is stored. In a 50-fields per second 625-line television system the number of active samples per line i may be 720 and the number of active lines j per field may be 288, whilst in a 60-fields per second 525-line television system the number of active samples i per line may again be 720 and the number of active lines j per field may be 243. Using standard length words, therefore, the number of bits to be stored per field is 207,360×8 or 174,960×8, respectively.

Figure 1B:
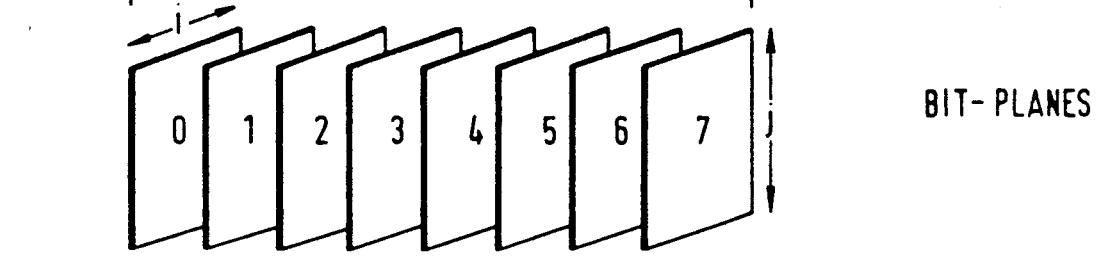

However, instead of regarding each field as a 2-dimensional array of 8-bit words, it can be regarded as eight 2-dimensional arrays of 1-bit words. Or, more generally, instead of regarding each field as a 2-dimensional array of n-bit words, it can be regarded as n 2-dimensional arrays of 1-bit words. This is indicated in FIG. 1B, where the field N is shown as eight bit-planes numbered 0 to 7. Thus the bit-plane 7 consists of the first or most significant bit of each of the standard length words from the field N, and so on. It will be seen that the digital video signal can now be envisaged as a sequence of such bit-planes, and in this form it has lost its dependency on n, the word length.

Figure 1C:
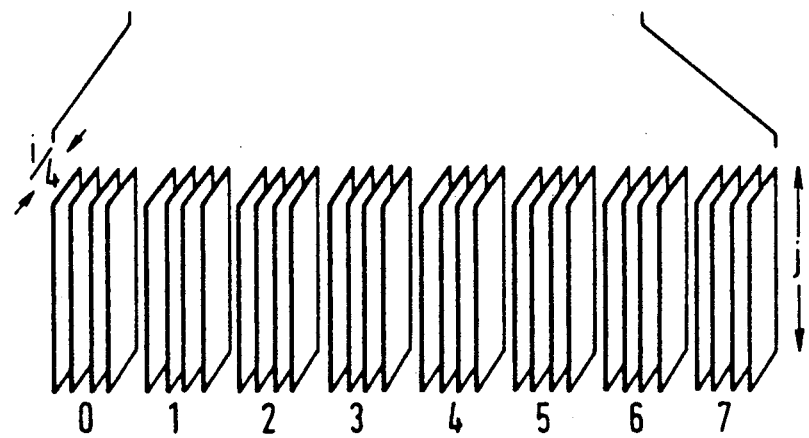

Considering purely storage capacity, a 256K random access memory (RAM), or more usually a 256K dynamic random access memory (DRAM) could be used to store each such bit-plane, but for real time operation the access times involved may require that each bit-plane be demultiplexed four ways as indicated in FIG. 1C, so that each of the bit-planes of FIG. 1B has become a group of four demultiplexed bit-planes (referred to herein as group-planes) as shown in FIG. 1C. Such a group of four demultiplexed bit-planes can conveniently be stored in a 64K×4 DRAM. The maximum value of n determines the width of the video data bus to and from the video signal store. Thus for n-bit words and a four-way demultiplex, a 4n-bit bus is necessary. In the embodiment shortly to be described, efficient storage of the digital video data comprising shorter words is achieved by re-arranging the bit-planes so that when they are supplied over the 4n-bit bus, they are correctly sited for abutting storage.

Figure 2:
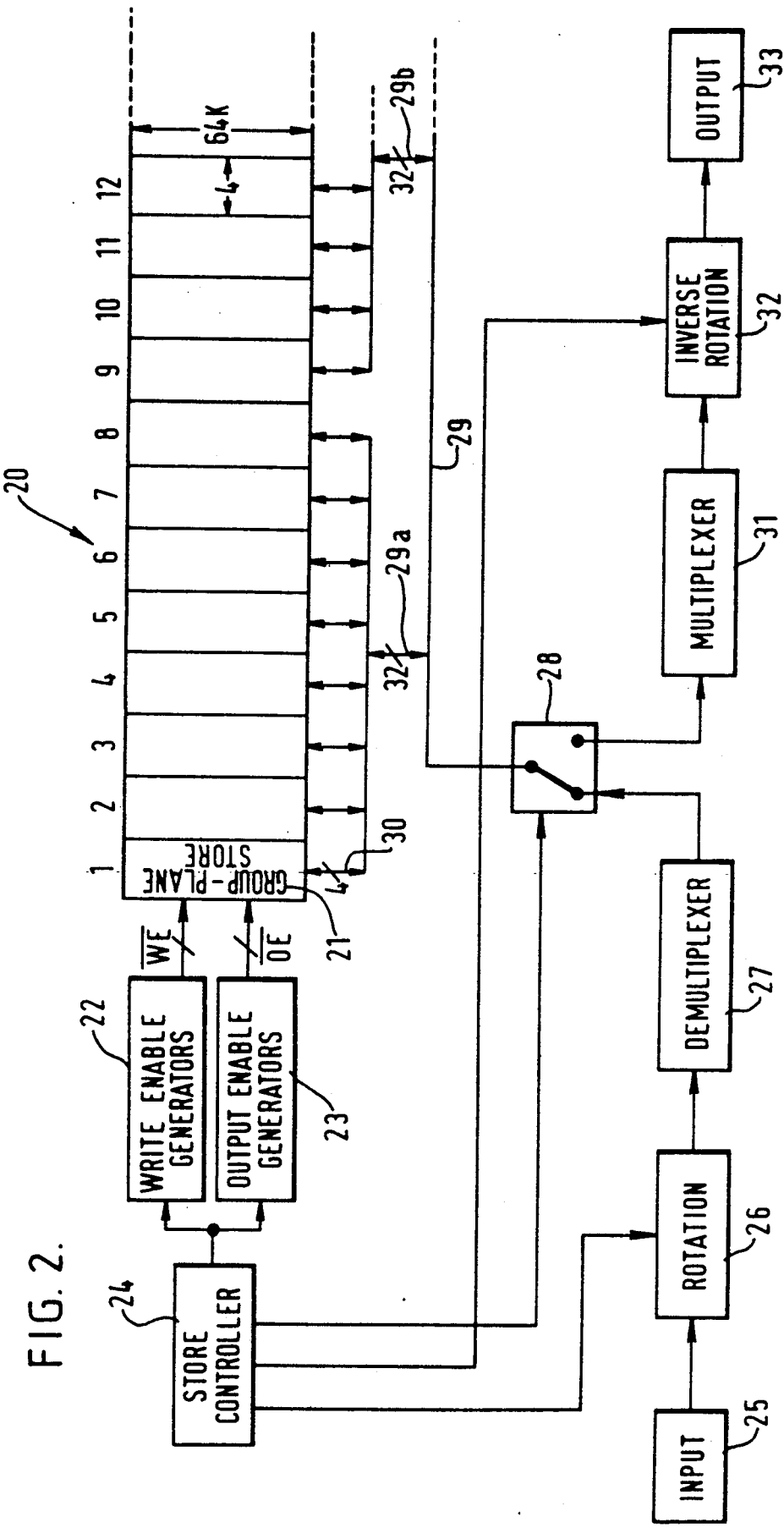
FIG. 2 shows in block diagrammatic form an embodiment of apparatus for storing digital video signals, the apparatus being in accordance with the present invention.

Turning now to FIG. 2, this shows in the block diagrammatic form an embodiment of apparatus for storing a digital video signal. The apparatus comprises a video signal store 20 formed by a series of group-plane stores 21, twelve of which are shown in the figure, although of course the actual number used will depend on the required overall size of the video signal store 20. Each group-plane store 21 is a 64K×4 DRAM (or RAM) so it can store a group of four demultiplexed bit-planes. Respectively associated with the group-plane stores 21 are write enable generators 22 and output enable generators 23, although for simplicity in the figure, only one of each is shown. All the write enable generators 22 and the output enable generators 23 are controlled by a store controller 24 which may comprise a microprocessor, so that write enable and output enable signals are supplied to the respective DRAMs forming the group-plane stores 21 at the appropriate times, as referred to in more detail below.

An input device 25 which may be a pulse code modulation coder or a differential pulse code modulation coder supplies digital video data to a known barrel rotation circuit or bit position rotation circuit 26 (the operation of which is described below), the output of which is connected by way of a 4-way demultiplexer circuit 27 to the input of a switching circuit 28. The switching circuit 28 is connected to a main data bus 29, which as explained above is thirty-two (8×4) bits wide. The group-plane stores 21 fall into groups of eight, corresponding to the maximum word length, and associated with each group-plane store 21 is a subsidiary data bus 30. The subsidiary data buses 30 are likewise grouped in eights and connected to respective branches 29a, 29b, ... of the main data bus 29.

The switching circuit 28 also has an output terminal which is connected to a 4-way multiplexer circuit 31, the output of which is supplied by way of an inverse barrel rotation circuit or bit position rotation circuit 32 to an output device 33, which may be a decoder. The switching circuit 28 is controlled by the store controller 24, as are the rotation circuits 26 and 32.

The operation will now be described, first with reference to FIG. 3, it which it is assumed that the digital video data to be stored consists of standard length words, that is 8-bit words. At the top of the figure is indicated a serial sequence of incoming words supplied from the input device 25, these words together making up one complete field of the incoming digital video signal (although for reasons of space only the first twelve words are shown in the figure), and each consisting of eight active bits D in parallel. These words pass unchanged through the rotation circuit 26 and are 4-way demultiplexed by the demultiplexer circuit 27 so as to form a serial sequence of 32-bit parallel data words as next shown in FIG. 3. The 32-bit data words are supplied by the switching circuit 28 to the main data bus 29 and thence to the first group of eight subsidiary data buses 30 for supply to the first eight group-plane stores 21 where they are stored in the appropriate bit storage locations under control of write enable signals from the write enable generators 22. The bits to be stored in one group-plane store 21 are bracketed by broken lines in FIG. 3.

Figure 3:
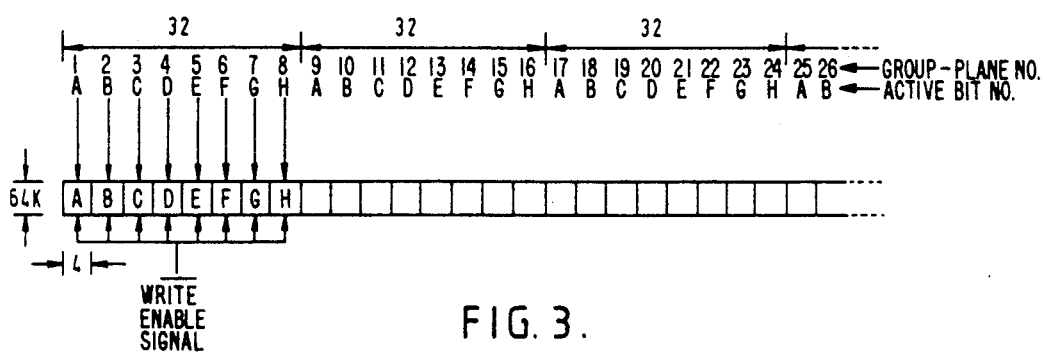
FIG. 3 shows diagrammatically how a video signal consisting of 8-bit words is stored in the apparatus of FIG. 2.

The bottom part of FIG. 3 shows that the first field is in fact supplied to all the group-plane stores 21, but the 32-bit data words of the first and succeeding fields are only stored in the appropriate group of eight group-plane stores 21 as determined by the write enable signals generated under the overall control of the store controller 24. When all the 32-bit data words of one field have been written in the first group of eight group-plane stores 21, writing of the next field proceeds in the next succeeding (abutting) group of eight group-plane stores 21. This proceeds until all the group-plane stores 21 have data stored therein, and then the writing returns to the first group of eight group-plane stores 21 for the originally stored data to be over-written by new data. Writing thus proceeds cyclically. Provision is made for refreshing the stored data as necessary in known manner.

When the stored digital video data is to be read, the operation is substantially the inverse of writing. The output enable generators 23 supply groups of output enable signals to the groups of eight group-plane stores 21, for example, but not necessarily, in sequence, under overall control of the store controller 24. The bits read out are supplied by way of the subsidiary data buses 30, the main data bus 29 and the switching circuit 28 to the multiplexer circuit 31 where the data is multiplexed to the original 8-bit parallel word form. The 8-bit data words are supplied unchanged by the inverse rotation circuit 32 to the output device 33. When a complete field has been read from a group of eight group-plane stores 21, reading for example proceeds to the next field in the next group of group-plane stores 21 under control of the output enable signals, and so on until all the fields stored in the video signal store 20 have been read.

Figure 4:
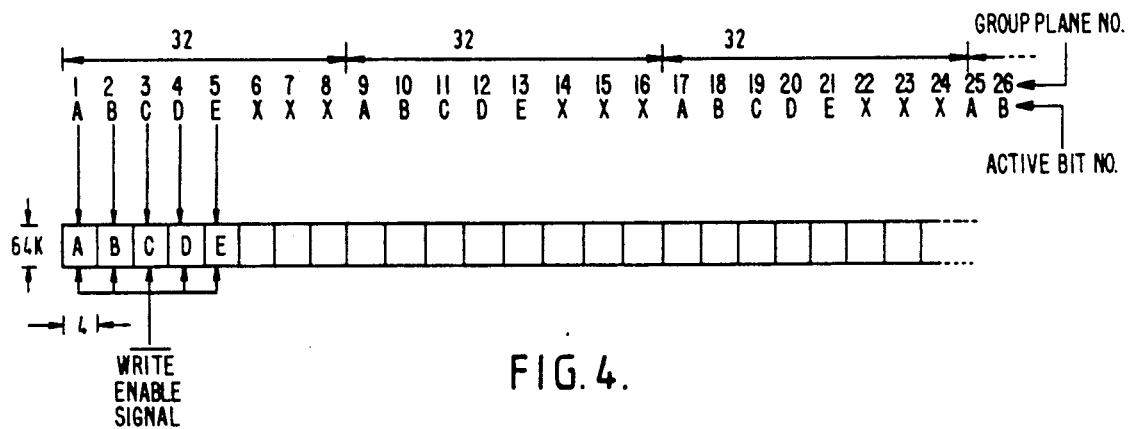
FIGS. 4 and 5 show diagrammatically how a video signal consisting of 5-bit words is stored in the apparatus of FIG. 2.

Turning now to FIG. 4, this shows the operation for storing the first field where the digital video data to be stored consists of shorter words, that is, where the input device 25 supplies 5-bit words, for example as a result of the selection of differential pulse code modulation. At the top of the figure is indicated a serial sequence of incoming words supplied from the input device 25, these words together making up one complete field of the incoming video signal (although for reasons of space only the first twelve words are shown in the figure), and each consisting of five active bits D in parallel. In other words, each word occupies only the five most significant bit positions, the unused bit positions being indicated by X. In the case of this particular field, these bits pass unchanged through the rotation circuit 26 and are then 4-way demultiplexed by the demultiplexer circuit 27 so as to form a serial sequence of 32-bit parallel data words of which only the most significant twenty bits are to be stored, as next shown in FIG. 4. These 32-bit data words are supplied by the switching circuit 28 to the main data bus 29 such that the said twenty bits are supplied to the first group of five subsidiary data buses 30 for supply to the first five group-plane stores 21 in synchronism with appropriate write enable signals from the write enable generators 22.

The bottom part of FIG. 4 shows that the first field is also supplied to subsequent group-plane stores 21 as indicated, but it is only stored in the appropriate first group of five group-plane stores 21 as determined by the write enable signals generated under the overall control of the store controller 24. The write enable generators 22 produce a full set of write enable signals and only those required at any given time are selected for supply to the respective DRAMs.

From consideration of the bottom part of FIG. 4 it will also be seen that if the storage of the 5-bit data words making up the next field of the digital video signal proceeded in the same way, then there would be a gap of three unfilled group-plane stores 21 between the successive groups of five filled group-plane stores 21. To avoid this inefficient use of the video signal store 20, the rotation circuit 26 (and the inverse rotation circuit 32) are used.

This will now be described with reference to FIG. 5, which shows the storage of the next field. As at the top of FIG. 4, the top of FIG. 5 indicates a serial sequence of incoming words supplied from the input device 25, these words making up the next complete field of the incoming video signal (although again for reasons of space only the first twelve words are shown in the figure) and each consisting of five active bits D in parallel. As these data words pass through the rotation circuit 26 they are rotated or rearranged to the format next shown in FIG. 5. Thus the bits of each word are moved five bit positions so that the most significant bit has moved to the sixth bit position, and the successive bits occupy the seventh, eighth, first and second bit positions. To perform this operation the rotation circuit 26 is conveniently formed by a programmable array logic (PAL) device, and the degree of rotation, that is bit displacement, effected is controlled by the store controller 24.

Figure 5:
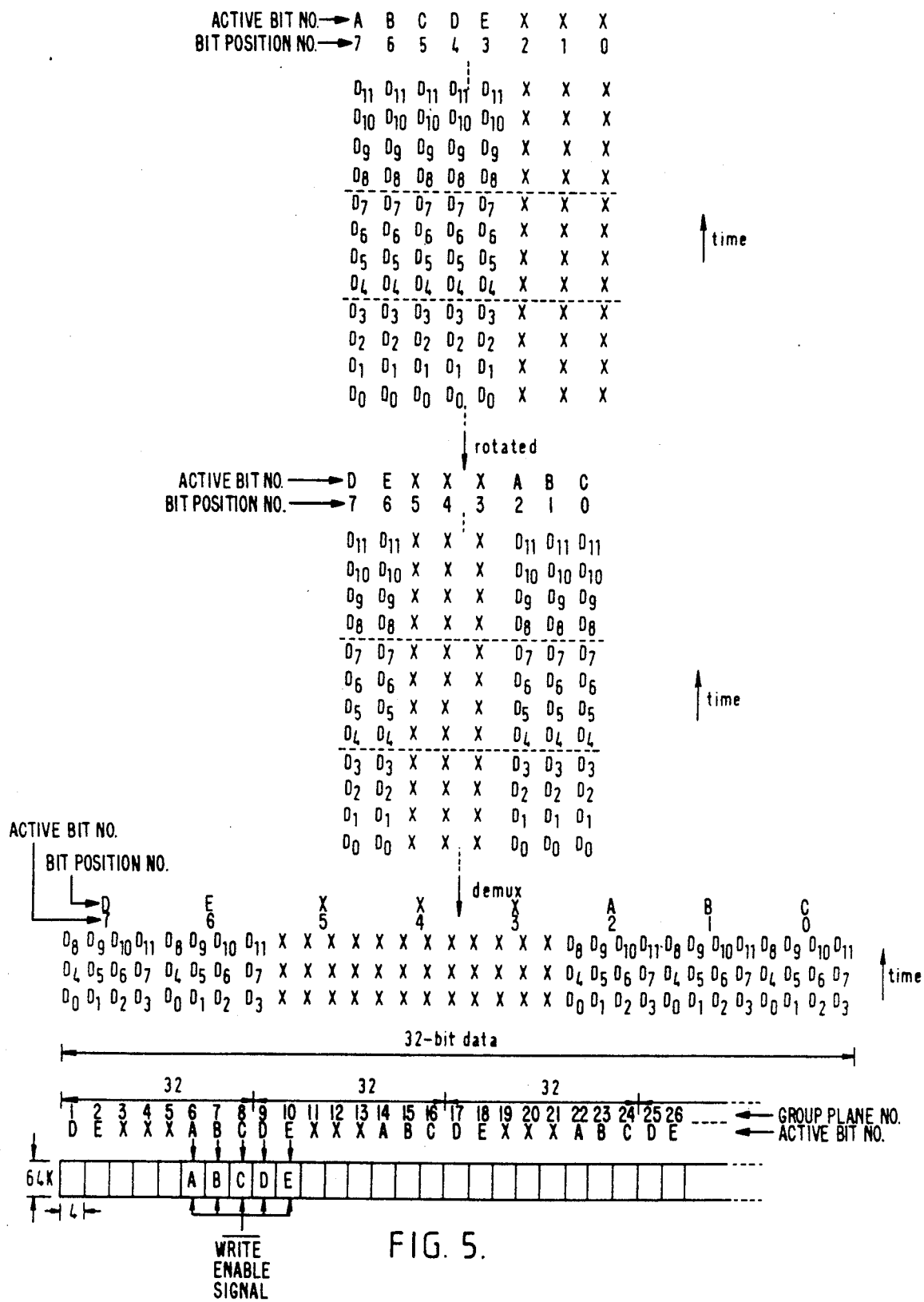

The resulting 5-bit words are 4-way demultiplexed by the demultiplexer circuit 27 so as to form a serial sequence of 32-bit parallel data words of which the twenty bits not denoted by X are to be stored, as next shown in FIG. 5. These 32-bit data words are supplied by the switching circuit 28 to the main data bus 29 such that the said twenty bits are supplied to the second group of five group-plane stores 21 in synchronism with appropriate write enable signals from the write enable generators 22.

The bottom part of FIG. 5 shows that by appropriate rotation of the incoming data words of successive fields, the digital video data of successive fields can be stored in successive groups of five group-plane stores 21, so that the storage capacity of the video signal store 20 is used to the full.

As before, read out is substantially the inverse of writing, with of course the inverse rotation circuit 32, which is likewise a PAL device controlled by the store controller 24, effecting inverse rotation to bring the bits of each read data word back into the first five most significant bit positions. The output enable generators 23 produce a full set of output enable signals and only those required at any given time are selected for supply to the respective DRAMs under the overall control of the store controller 24.

It will be apparent that various modifications can be made without departing from the scope of the invention as defined by the appended claims. In particular, the operation of the embodiment of FIG. 2 can readily be modified to cases where the shorter words have some other number of bits less than eight but not equal to five. Also, of course, the embodiment can be changed as desired to accommodate standard words and shorter words of other lengths and generally to accommodate other changes such as different sampling rates and different durations of video signal to be stored. Moreover, multiplexing of the bit-planes will not be necessary if the access times of the memories of the video signal store 20 are sufficiently short.

I claim:

1. A method of storing a plurality of fields of digital video signal where each field consists of a plurality of data words and where the number of bits in a data word varies for different fields but is less than or equal to a predetermined maximum number of bits, the method comprising the steps of:

arranging the data words of each field into a number of bit-planes equal in number to the number of bits in each data word, each said bit-plane containing a same respective bit from each successive data word of each field;

providing a video signal store comprising a plurality of memories each memory capable of storing one of said bit-planes;

supplying said bit-planes over a common data bus to said memories; and controlling writing of said bit-planes to said memories such that bit-planes of a first field are written to a first number of said memories equal in number to the number of bits in each data word of said first field, bit-planes of a next field are written to a second number of said memories equal in number to the number of bits in each data word of said next field, and so on until all said memories have been written in, and where the number of bits in the data word varies for each successive field but is less than or equal to a predetermined maximum number of bits.

2. A method according to claim 1 wherein said controlling of said writing of said data words includes the step of rearranging the positions of the bits of each data word within a word of said predetermined maximum number of bits.

3. A method according to claim 1 wherein said supplying of said bit-planes over said common data bus includes the step of multiplexing a predetermined number of data words to form a common data bus word, said common data bus word supplied to said memories by said common data bus, said common data bus is said predetermined number of data words multiplied by said predetermined maximum number of bits in a data word bits wide, and each said memory is capable of storing a number of bit-planes equal in number to said predetermined number of data words.

4. Apparatus for storing a plurality of fields of digital video signal where each field consists of a plurality of data words and where the number of bits in a data word varies for different fields and is less than or equal to a predetermined maximum number of bits, the apparatus comprising:

means for arranging the data words of each field into a number of bit-planes equal in number to the number of bits in each data word, each said bit-plane containing a same respective bit from each successive data word of each field;

a video signal store comprising a plurality of memories each memory capable of storing one of said bit-planes;

a common data bus for supplying said bit-planes to said memories; and means for controlling writing of said bit-planes to said memories such that bit-planes of a first field are written to a first number of said memories equal in number to the number of bits in the data word of said first field, bit-planes of a next field are written to a second number of said memories equal in number to the number of bits in the data word of said next field, and so on until all said memories have been written in, and where the number of bits in the data word varies for each successive field but is less than or equal to a predetermined maximum number of bits.

5. Apparatus according to claim 4 wherein said means for controlling writing includes a bit position rotation circuit for rearranging the positions of the bits of each data word within a word of said predetermined maximum number of bits.

6. Apparatus according to claim 5 further comprising means for controlling reading of said bit-planes from said memories, said means for controlling reading including a second bit position rotation circuit for further rearranging the positions of the bits read from said memories back into the original positions within the data word.

7. Apparatus according to claim 6 wherein each of said bit position rotation circuits comprises a programmable array logic device.

8. Apparatus according to claim 4 further comprising a multiplexer for multiplexing a predetermined number of data words to form a common data bus word, said common data bus word being supplied to said memories by said common data bus, and wherein said common data bus is said predetermined number of data words multiplied by said predetermined maximum number of bits in a data word bits wide, and each said memory is capable of storing a number of bit-planes equal in number to said predetermined number of data words.

9. Apparatus according to claim 8 wherein said common data bus is branched, each said branch being said predetermined number of data words multiplied by said predetermined maximum number of bits in a data word bits wide, each said branch is connected to a number of subsidiary data buses equal in number to the predetermined maximum number of bits in a data word, each said subsidiary data bus is a number of bits equal in number to said predetermined number of data words wide, and each said subsidiary data bus is connected to a respective memory.

10. Apparatus according to claim 8 wherein said predetermined number of data words is equal to four.

11. Apparatus according to claim 4 wherein said predetermined maximum number of bits is equal to eight.

12. Apparatus according to claim 4 wherein each said memory is a random access memory or a dynamic random access memory.

* * * * *